(12) United States Patent
Hsieh et al.

(10) Patent No.: US 7,298,388 B2
(45) Date of Patent: Nov. 20, 2007

(54) MULTI-FUNCTION PERIPHERAL WITH A SINGLE SHEET-FEEDING MECHANISM

(75) Inventors: Te-Chuan Hsieh, Kaohsiung (TW); Chiao-Min Mai, Hsinchu (TW)

(73) Assignee: Avision Inc. (TW)

( * ) Notice: Subject to any disclaimer, the term of this patent is extended or adjusted under 35 U.S.C. 154(b) by 364 days.

(21) Appl. No.: 11/098,479

(22) Filed: Apr. 5, 2005

(65) Prior Publication Data

US 2005/0225623 A1    Oct. 13, 2005

(30) Foreign Application Priority Data

Apr. 8, 2004    (TW) .............................. 93109772 A

(51) Int. Cl.
*H04N 1/00* (2006.01)
(52) U.S. Cl. ........................ 347/218; 358/401; 358/498
(58) Field of Classification Search .................... 347/3, 347/4, 218; 358/471, 474, 494–498, 501–503, 358/401
See application file for complete search history.

(56) References Cited

U.S. PATENT DOCUMENTS 5,896,206 A    4/1999    Kellogg

FOREIGN PATENT DOCUMENTS

| JP | 11-187194 A | 7/1999 |
|----|-------------|--------|
| JP | 2001-77976 A | 3/2001 |

OTHER PUBLICATIONS

Computer-translated translation of JP 11-187194.*
Computer-translated translation of JP 2001-077976.*

* cited by examiner

*Primary Examiner*—Huan Tran

(57) ABSTRACT

A multi-function peripheral includes a first scan module for scanning a front side of a to-be-scanned document, a print module for printing data on a to-be-printed sheet, and a sheet-feeding mechanism for feeding the to-be-scanned document and the to-be-printed sheet and for moving the to-be-scanned document and the to-be-printed sheet along a sheet feeding path and across the first scan module and the print module.

20 Claims, 6 Drawing Sheets

MULTI-FUNCTION PERIPHERAL WITH A SINGLE SHEET-FEEDING MECHANISM

BACKGROUND OF THE INVENTION

1. Field of the Invention

The invention relates to a multi-function peripheral with a single sheet-feeding mechanism, and more particularly to a multi-function peripheral having a single sheet-feeding mechanism to perform the scan and print operations.

2. Description of the Related Art

A multi-function peripheral (MFP) available in the current market has combined the scan and print functions. A sheet-feeding mechanism for feeding a to-be-scanned document is utilized in a sheet-fed scanning mode such that a scan module scans the to-be-scanned document. Another sheet-feeding mechanism for feeding a to-be-printed sheet is utilized in a printing mode such that a print module can print data on the to-be-printed sheet. That is, the scan module and the print module individually utilize different sheet-feeding mechanisms or different sheet-feeding principles to feed the document and sheet.

Thus, the conventional multi-function peripheral needs two sheet-feeding mechanisms. So, the resource, cost and space are wasted, and the system integration becomes more complicated accordingly.

SUMMARY OF THE INVENTION

It is therefore an object of the invention to provide a multi-function peripheral with a single sheet-feeding mechanism to perform the scan and print operations.

To achieve the above-mentioned object, the invention provides a multi-function peripheral including a first scan module, a print module and a sheet-feeding mechanism. The first scan module scans a front side of a to-be-scanned document. The print module prints data on a to-be-printed sheet. The sheet-feeding mechanism feeds the to-be-scanned document and the to-be-printed sheet and moves the to-be-scanned document and the to-be-printed sheet along a sheet feeding path and across the first scan module and the print module.

Replacing two independent sheet-feeding mechanisms of the prior art with one single sheet-feeding mechanism to perform the scan and print operations can decrease the manufacturing cost, save the occupied space, and facilitate the miniaturization of the multi-function peripheral.

DETAILED DESCRIPTION OF THE INVENTION

Figure 1:
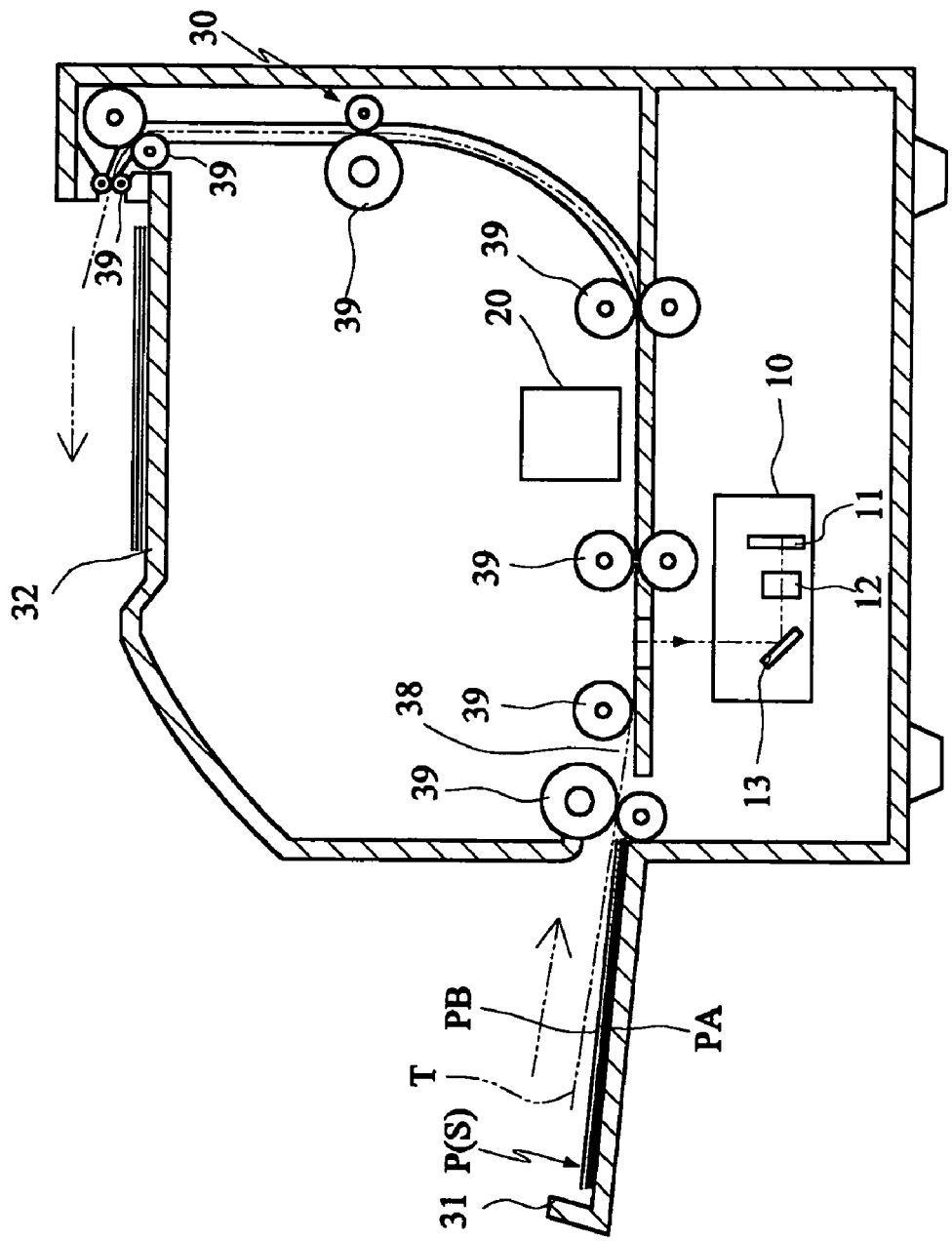
FIG. 1 is a schematic illustration showing a multi-function peripheral according to a first embodiment of the invention.

FIG. 1 is a schematic illustration showing a multi-function peripheral according to a first embodiment of the invention. Referring to FIG. 1, a multi-function peripheral 1 of this embodiment includes a first scan module 10, a print module 20 and a sheet-feeding mechanism 30. The first scan module 10 scans a front side PA of a to-be-scanned document P. The print module 20 prints data on a to-be-printed sheet S. The sheet-feeding mechanism 30 feeds the to-be-scanned document P and the to-be-printed sheet S moves the to-be-scanned document P and the to-be-printed sheet S along a sheet feeding path T and across the first scan module 10 and the print module 20 for the scan and print operations.

In this embodiment, the first scan module 10 is a CCD (Charge Coupled Device) scan module. In another embodiment, the first scan module 10 is a CIS (Contact Image Sensor) scan module. The first scan module 10 includes a CCD image sensor 11, a lens 12 and at least one reflecting mirror 13. Light rays coming from the to-be-scanned document P are reflected by the at least one reflecting mirror 13, focused by the lens 12, and then received by the CCD image sensor 11. The print module 20 is an ink-jet print module in this embodiment, and may be a laser print module, a thermal print module or a dot matrix type print module in another embodiment. The sheet-feeding mechanism 30 includes a sheet input tray 31, a sheet output tray 32, a sheet feeding passageway 38 and a plurality of sheet feeding rollers 39. The sheet feeding rollers 39 feed the to-be-scanned document P or the to-be-printed sheet S, which is stored in the sheet input tray 31, to a sheet input passageway 33. Then, the sheet feeding rollers 39 feed the document P or the sheet S to the sheet output tray 32 after the scan or print operation is finished. Alternatively, it is also possible to use at least one sheet feeding component (e.g., a belt in a belt type sheet-feeding mechanism) to advance the to-be-scanned document P and the to-be-printed sheet S from the sheet input tray 31 to the sheet output tray 32 through the sheet feeding passageway 38. Therefore, the sheet input tray 31 is linked to the sheet output tray 32 via the sheet feeding passageway 38, such that the to-be-scanned document P and the to-be-printed sheet S are inputted from the sheet input tray 31 and outputted to the sheet output tray 32.

In this embodiment, the to-be-scanned document P and the to-be-printed sheet S are moved firstly across the first scan module 10 and then the print module 20. In addition, the print module 20 and the first scan module 10 are disposed on opposite sides of the sheet feeding path T. That is, the first scan module 10 is disposed at a lower side of the sheet feeding path T, and the print module 20 is disposed at an upper side of the sheet feeding path T. In other embodiments, however, the to-be-scanned document P and the to-be-printed sheet S are moved firstly across the print module 20 and then across the first scan module 10. Alternatively, the print module 20 and the first scan module 10 are disposed on the same side of the sheet feeding path T.

Figure 2:
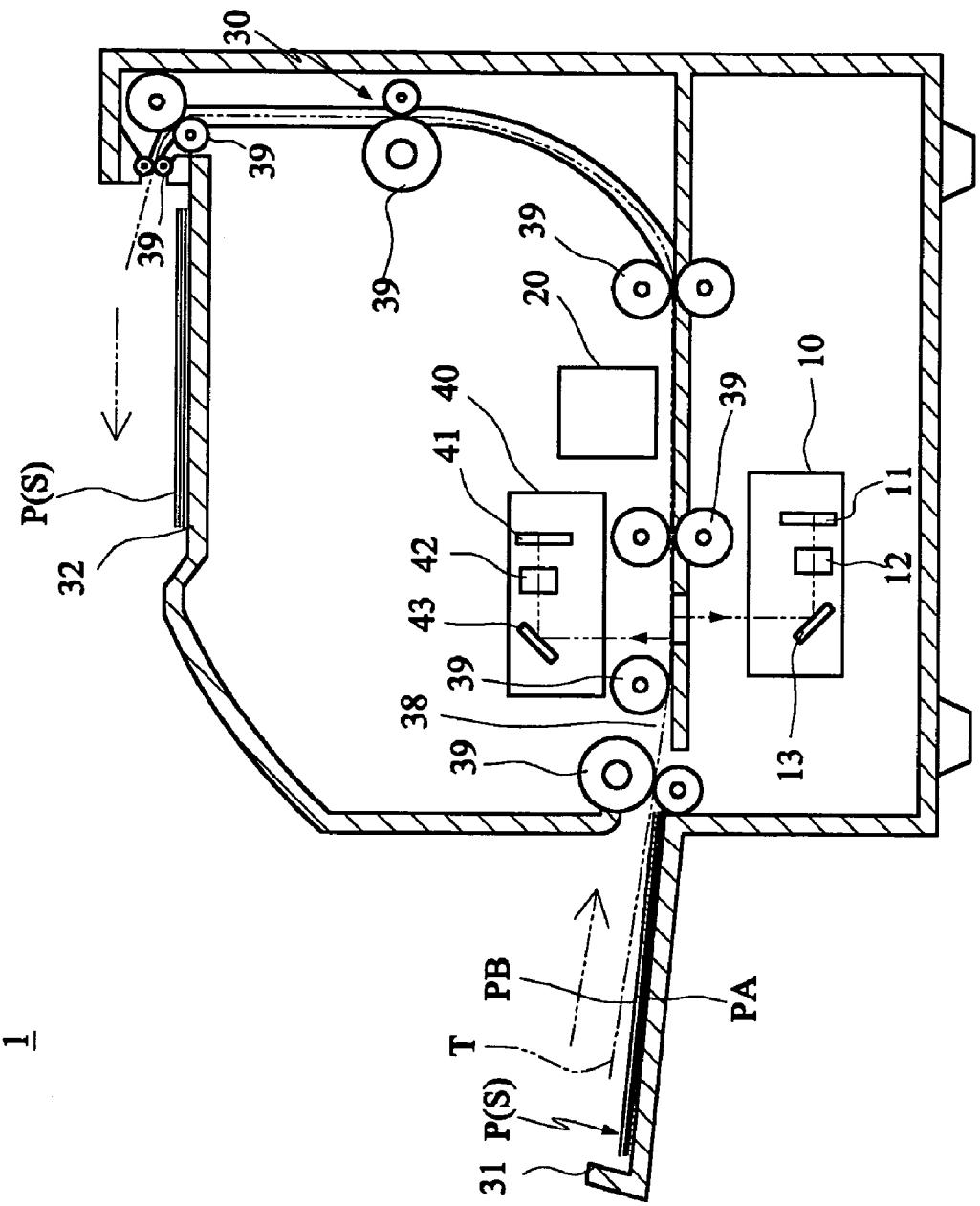
FIG. 2 is a schematic illustration showing a multi-function peripheral according to a second embodiment of the invention.

FIG. 2 is a schematic illustration showing a multi-function peripheral according to a second embodiment of the invention. As shown in FIG. 2, this embodiment is similar to the first embodiment except that the multi-function peripheral 1 of this embodiment further includes a second scan module 40 for scanning a back side PB of the to-be-scanned document P. The second scan module 40 including a CCD image sensor 41, a lens 42 and at least one reflecting mirror 43 performs the same scan operation as the first scan module 10. Thus, the duplex scan effect can be achieved.

Figure 3:
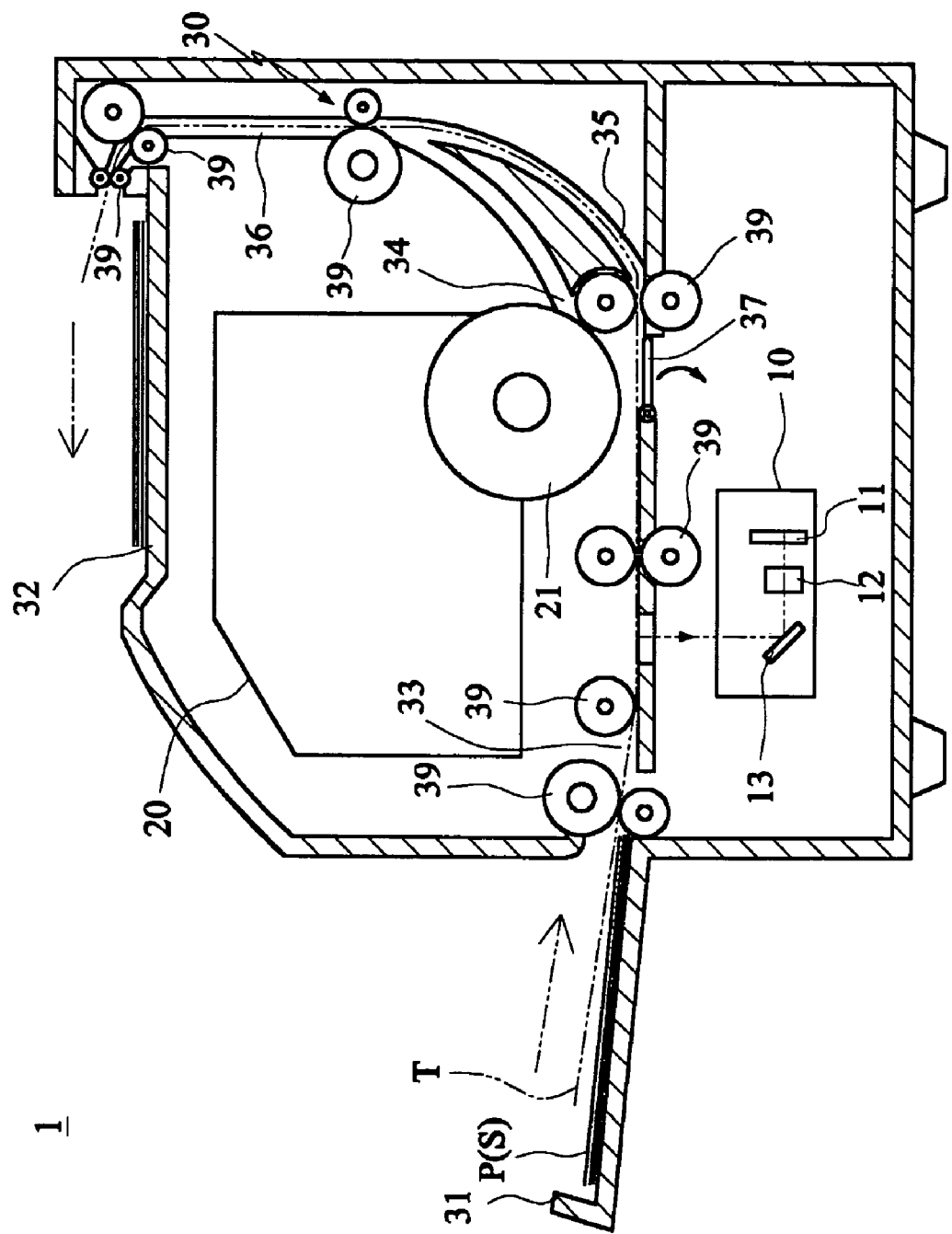
FIGS. 3 and 4 are schematic illustrations showing a multi-function peripheral according to a third embodiment of the invention.
Figure 4:
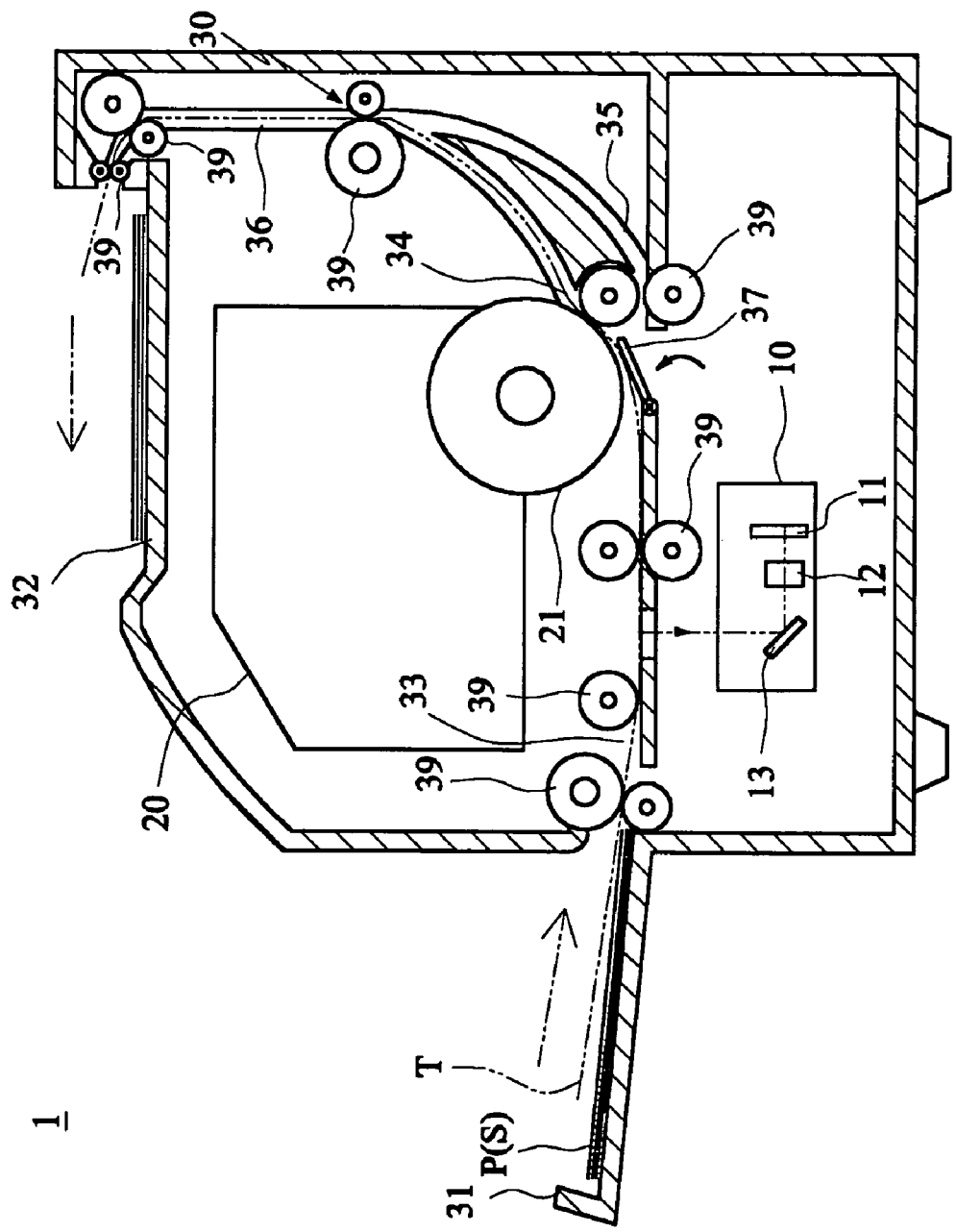

FIGS. 3 and 4 are schematic illustrations showing a multi-function peripheral according to a third embodiment of the invention. As shown in FIGS. 3 and 4, this embodiment is similar to the first embodiment except that the sheet-feeding mechanism 30 of this embodiment moves the to-be-scanned document P and the to-be-printed sheet S along different paths so as to prevent the to-be-scanned document P from being tarnished by the laser or thermal print module 20. The sheet-feeding mechanism 30 includes a sheet input passageway 33, a print passageway 34, a bypass passageway 35, a sheet output passageway 36 and a guiding rod 37. The to-be-scanned document P and the to-be-printed sheet S are inputted from the sheet input tray 31 to the sheet input passageway 33. The print passageway 34 selectively communicates with the sheet input passageway 33 such that the print module 20 can print data on the to-be-printed sheet S fed through the print passageway 34. The bypass passageway 35 selectively communicates with the sheet input passageway 33 such that the to-be-scanned document P may be fed therethrough. The sheet output passageway 36 communicates with print passageway 34 and the bypass passageway 35 so as to output the to-be-scanned document P and the to-be-printed sheet S to the sheet output tray 32. The guiding rod 37 is capable of rotating to guide the to-be-scanned document P from the sheet input passageway 33 to the bypass passageway 35, or to guide the to-be-printed sheet S from the sheet input passageway 33 to the print passageway 34.

In this embodiment, the sheet or document is fed from a lower position to an upper position. So, the sheet input tray 31 is disposed at a position lower than that of the sheet output tray 32, and this configuration is similar to that of the current printer.

As shown in FIG. 3, when a scan operation is being performed, the sheet-feeding mechanism 30 feeds the to-be-scanned document P from the sheet input tray 31 to the sheet input passageway 33, in which the first scan module 10 scans the to-be-scanned document P. The guiding rod 37 rotates into a horizontal state such that the document P enters the bypass passageway 35 from the sheet input passageway 33, enters the sheet output passageway 36 from the bypass passageway 35, and finally arrives at the sheet output tray 32. In this state, a drum 21 of the print module 20 does not contact the document P.

As shown in FIG. 4, when a print operation is being performed, the sheet-feeding mechanism 30 feeds the to-be-printed sheet S from the sheet input tray 31 into the sheet input passageway 33, in which the first scan module 10 does not scan the to-be-printed sheet S. The guiding rod 37 rotates into a slanting state such that the to-be-printed sheet S enters the print passageway 34 from the sheet input passageway 33, in which the print module 20 prints data on the to-be-printed sheet S. Then, the sheet S enters the sheet output passageway 36 from the print passageway 34 and finally arrives at the sheet output tray 32.

Figure 5:
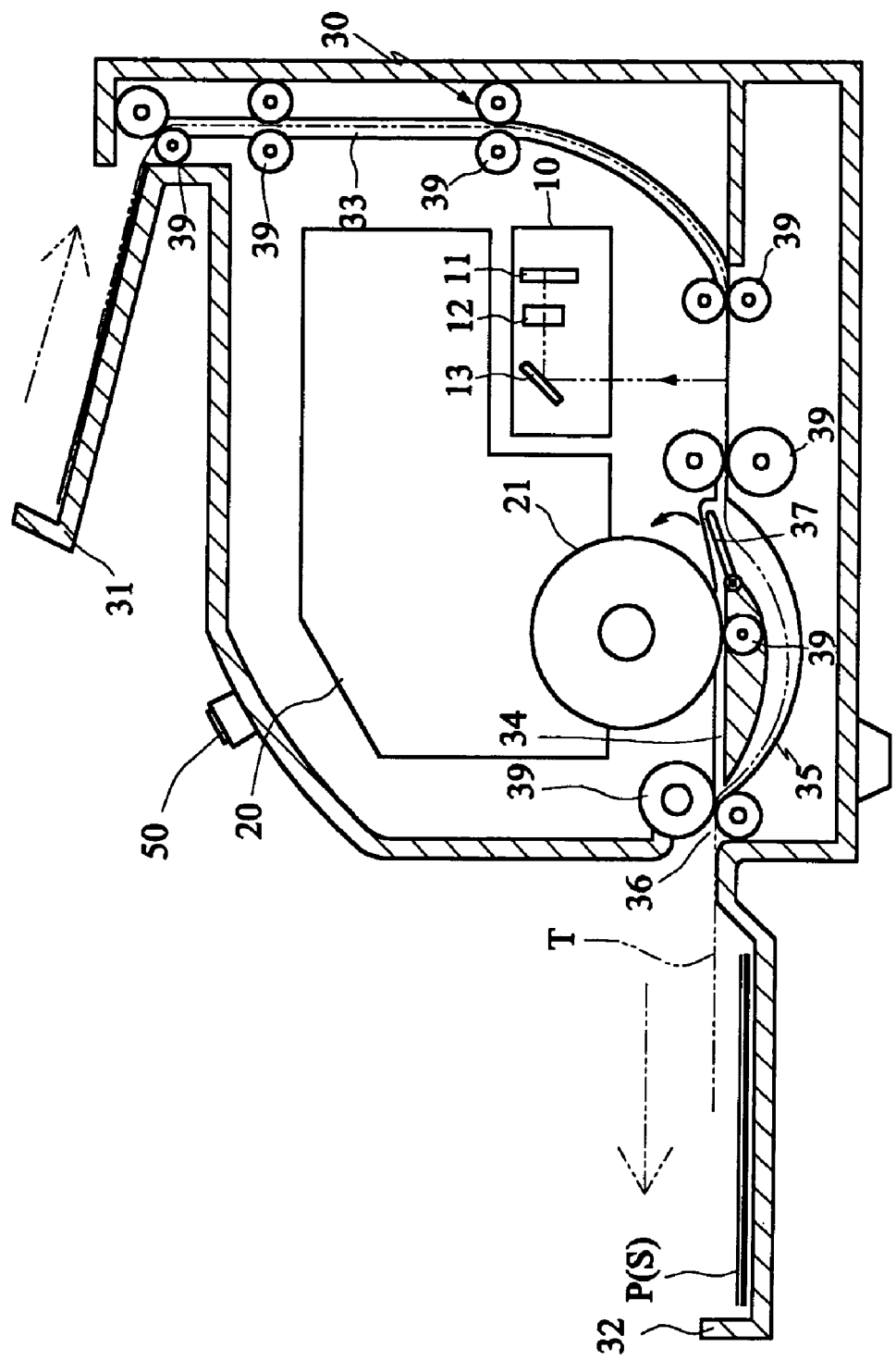
FIGS. 5 and 6 are schematic illustrations showing a multi-function peripheral according to a fourth embodiment of the invention.
Figure 6:
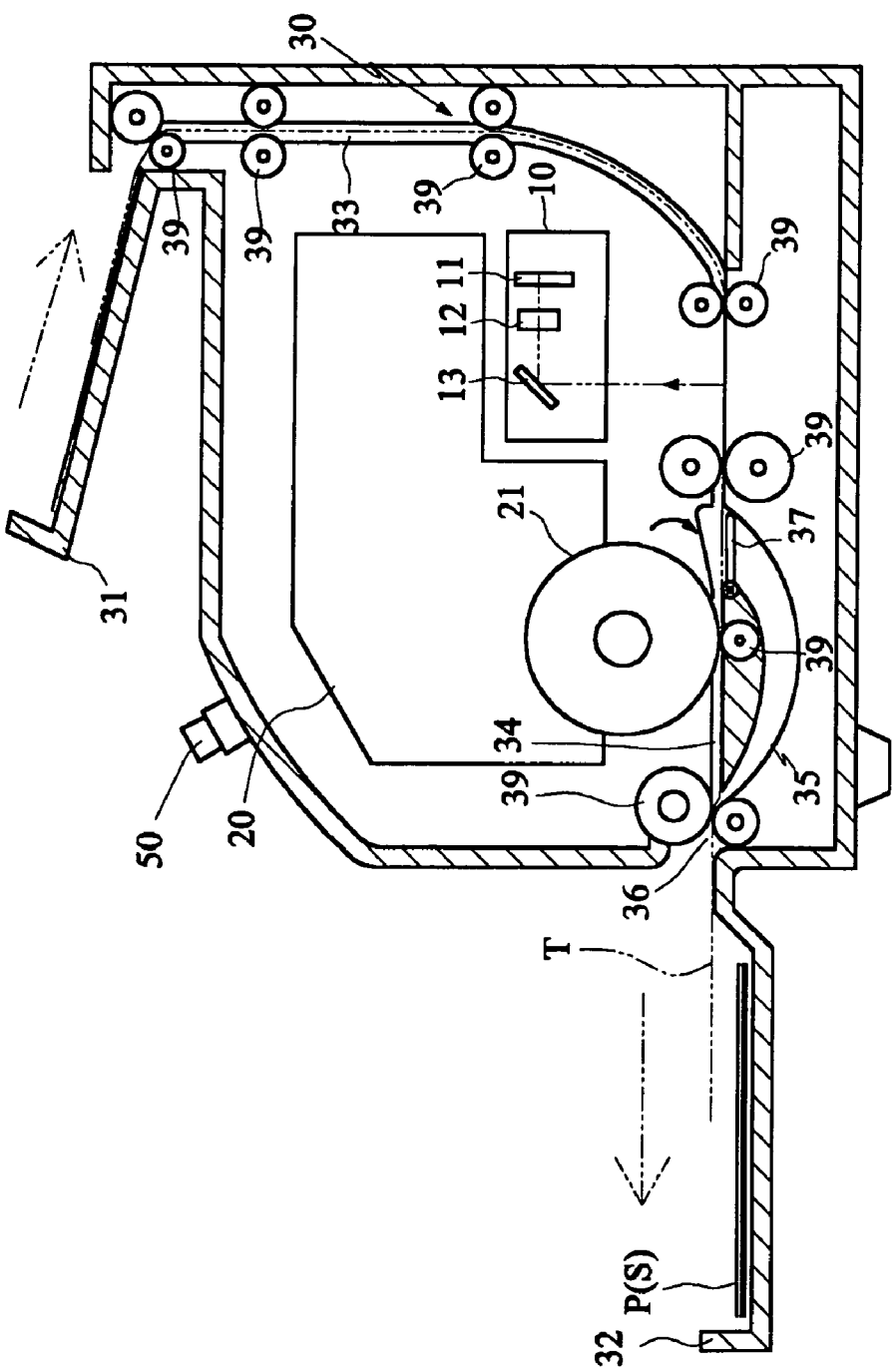

FIGS. 5 and 6 are schematic illustrations showing a multi-function peripheral according to a fourth embodiment of the invention. As shown in FIGS. 5 and 6, this embodiment is similar to the third embodiment except that the sheet input tray 31 of this embodiment is disposed at a position higher than that of the sheet output tray 32. Such a configuration is similar to that of the current scanner. In addition, the multi-function peripheral 1 of this embodiment further includes a switch 50. The user can operate the switch 50 to control a rotation position of the guiding rod 37 so as to control feeding paths of the to-be-scanned document P and the to-be-printed sheet S selectively. The switch 50 may further control the first scan module 10 and the print module 20 to perform the scan and print operations, respectively. Alternatively, the switch 50 can directly control the first scan module 10 and the print module 20 to perform the scan and print operations without controlling the rotation position of the guiding rod 37. Thus, it is possible to prevent the scan and print operations from being performed in error. The switch 50 may also be implemented in FIGS. 1 to 4.

The invention replaces the conventional two sheet-feeding mechanisms with the single sheet-feeding mechanism to perform the scan and print operations, so it is possible to decrease the manufacturing cost, save the space, and facilitate the miniaturization of the multi-function peripheral. In addition, the single sheet-feeding mechanism of the invention simplifies the multi-function peripheral, and the chance of failure or wear possibility can be decreased. Furthermore, because only one sheet input tray and one sheet output tray are provided, the peripheral may be operated in a more human-oriented manner. The switch can be configured such that the scan mode or print mode of the multi-function peripheral can be locked after the user has placed the sheets or documents in order to prevent the peripheral from operating in error.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A multi-function peripheral, comprising:
   a first scan module for scanning a front side of a to-be-scanned document;
   a print module for printing data on a to-be-printed sheet;
   a sheet-feeding mechanism for feeding the to-be-scanned document and the to-be-printed sheet and for moving the to-be-scanned document and the to-be-printed sheet along a sheet feeding path and across the first scan module and the print module;
   a sheet input tray for storing the to-be-scanned document and the to-be-printed sheet to be fed; and
   a sheet output tray for storing the to-be-scanned document and the to-be-printed sheet outputted from the sheet-feeding mechanism.

2. The multi-function peripheral according to claim 1, wherein each of the to-be-scanned document and the to-be-printed sheet is moved firstly across the first scan module, arid then across the print module.

3. The multi-function peripheral according to claim 1, wherein each of the to-be-scanned document and the to-be-printed sheet is moved firstly across the print module, and then across the first scan module.

4. The multi-function peripheral according to claim 1, wherein the print module and the first scan module are disposed on opposite sides of the sheet feeding path.

5. The multi-function peripheral according to claim 1, wherein the print module and the first scan module are disposed on the same side of the sheet feeding path.

6. The multi-function peripheral according to claim 1, further comprising:
   a second scan module for scanning a back side of the to-be-scanned document.

7. The multi-function peripheral according to claim 1, wherein the sheet-feeding mechanism comprises:
   a sheet feeding passageway for guiding the to-be-scanned document and the to-be-printed sheet across the first scan module and the print module and outputting the to-be-scanned document and the to-be-printed sheet; and at least one sheet feeding component for advancing the to-be-scanned document and the to-be-printed sheet through and then out of the sheet feeding passageway.

8. The multi-function peripheral according to claim 1, wherein the sheet-feeding mechanism comprises:

a sheet input passageway into which the to-be-scanned document and the to-be-printed sheet are inputted;

a print passageway selectively communicating with the sheet input passageway, wherein the print module prints the data on the to-be-printed sheet fed through the print passageway;

a bypass passageway selectively communicating with the sheet input passageway such that the to-be-scanned document is fed through the bypass passageway; and a sheet output passageway, which communicates with the print passageway and the bypass passageway, for outputting the to-be-scanned document and the to-be-printed sheet.

9. The multi-function peripheral according to claim 8, wherein the sheet-feeding mechanism further comprises:

a guiding rod capable of rotating to guide the to-be-scanned document from the sheet input passageway to the bypass passageway, or to guide the to-be-printed sheet from the sheet input passageway to the print passageway.

10. The multi-function peripheral according to claim 9, further comprising:

a switch operated by a user to control the first scan module and the print module to perform a scan operation and a print operation, respectively.

11. The multi-function peripheral according to claim 9, further comprising:

a switch operated by a user to control a rotation position of the guiding rod.

12. The multi-function peripheral according to claim 11, wherein the switch further controls the first scan module and the print module to perform a scan operation and a print operation, respectively.

13. The multi-function peripheral according to claim 1, wherein the first scan module is a CCD (Charge Coupled Device) or a CIS (Contact Image Sensor) scan module.

14. The multi-function peripheral according to claim 1, wherein the print module is a laser print module, a thermal print module, an ink-jet print module or a dot matrix type print module.

15. The multi-function peripheral according to claim 1, further comprising:

a switch operated by a user to control the first scan module and the print module to perform a scan operation and a print operation, respectively.

16. The multi-function peripheral according to claim 1, wherein the sheet-feeding mechanism comprises:

a sheet feeding passageway for guiding the to-be-scanned document and the to-be-printed sheet from the sheet input tray to the sheet output tray; and at least one sheet feeding component for advancing the to-be-scanned document and the to-be-printed sheet from the sheet input fray to the sheet output tray through the sheet feeding passageway.

17. The multi-function peripheral according to claim 1, wherein the sheet-feeding mechanism comprises:

a sheet input passageway into which the to-be-scanned document and the to-be-printed sheet from the sheet input tray are inputted;

a print passageway selectively communicating with the sheet input passageway, wherein the print module prints the data on the to-be-printed sheet fed through the print passageway;

a bypass passageway selectively communicating with the sheet input passageway such that the to-be-scanned document is fed through the bypass passageway; and a sheet output passageway, which communicates with the print passageway and the bypass passageway, for outputting the to-be-scanned document and the to-be-printed sheet to the sheet output tray.

18. The multi-function peripheral according to claim 17, wherein the sheet-feeding mechanism further comprising:

a guiding rod capable of rotating to guide the to-be-scanned document from the sheet input passageway to the bypass passageway, or to guide the to-be-printed sheet from the sheet input passageway to the print passageway.

19. The multi-function peripheral according to claim 1, wherein the sheet input tray is disposed at a position lower than that of the sheet output tray.

20. The multi-function peripheral according to claim 1, wherein the sheet input tray is disposed at a position higher than that of the shoot output tray.

* * * * *